United States Patent

Haye et al.

[11] Patent Number: 6,078,932
[45] Date of Patent: Jun. 20, 2000

[54] POINT-IN-TIME BACKUP UTILIZING MULTIPLE COPY TECHNOLOGIES

[75] Inventors: Mark Alan Haye; Ronald Maynard Kern; David Michael Shackelford, all of Tucson, Ariz.

[73] Assignee: International Business Machines Corporation, Armonk, N.Y.

[21] Appl. No.: 09/006,638

[22] Filed: Jan. 13, 1998

[51] Int. Cl.[7] .................................................. G06F 17/30
[52] U.S. Cl. ...................................... 707/204; 395/200.31
[58] Field of Search ........................ 707/1–10, 100–104, 707/200–206; 395/200.3, 200.31–200.39, 703, 712

[56] References Cited

U.S. PATENT DOCUMENTS

| | | | |
|---|---|---|---|
| 5,241,670 | 8/1993 | Eastridge et al. | 711/162 |
| 5,263,154 | 11/1993 | Eastridge et al. | 364/268 |
| 5,379,412 | 1/1995 | Eastridge et al. | 711/162 |
| 5,455,646 | 10/1995 | White | 353/25 |
| 5,515,502 | 5/1996 | Wood | 364/282.1 |
| 5,574,898 | 11/1996 | Leblang et al. | 707/1 |
| 5,592,618 | 1/1997 | Micka et al. | 711/162 |
| 5,594,900 | 1/1997 | Cohn et al. | 707/202 |
| 5,642,496 | 6/1997 | Kanfi | 711/162 |
| 5,649,200 | 7/1997 | Leblang et al. | 395/703 |
| 5,742,818 | 4/1998 | Shoroff et al. | 707/200 |
| 5,852,715 | 12/1998 | Raz et al. | 395/200.31 |
| 5,854,754 | 12/1998 | Cabrera et al. | 364/578 |
| 5,873,101 | 2/1999 | Klein | 707/204 |

*Primary Examiner*—Ruay Lian Ho
*Attorney, Agent, or Firm*—David W. Victor; Konrad Raynes & Victor

[57] ABSTRACT

A method, apparatus, and article of manufacture for performing a point-in-time backup using multiple copy technologies includes steps of suspending execution of updates to the source data; determining what point-in-time backup technology is supported by the device by determining the device and extents of the source data; processing each of the extents as determined by the backup technology supported and copying the source data in point-in-time; and backing up copied entire source data to a target media. If the backup process fails, the method, apparatus, and article of manufacture provides a restart function.

18 Claims, 3 Drawing Sheets

POINT-IN-TIME BACKUP UTILIZING MULTIPLE COPY TECHNOLOGIES

CROSS-REFERENCE TO RELATED APPLICATION

This application is related to co-pending and commonly-assigned patent application Ser. No. 09/006,548, filed on same date herewith, by David R. Blea, Donald R. Blea, Mark A. Haye, Ronald M. Kern, David M. Shackelford, and John G. Thompson, entitled "METHOD FOR IMPLEMENTING POINT-IN-TIME COPY USING A SNAPSHOT FUNCTION," attorney's docket number TU997076, which application is incorporated herein by reference.

BACKGROUND OF THE INVENTION

1. Field of the Invention

This invention relates in general to improvements in the field of computer systems having backup/restore or archive/retrieve subsystems, and more particularly, to a method for implementing point-in-time copy operations using multiple copy technologies.

2. Description of Related Art

In a data processing system, a backup/restore subsystem is typically used to save a recent copy or version of one or more data sets or portion thereof on some form of backup data storage device, such as magnetic or optical disk drives, tape drives, or other memory.

The backup/restore subsystem is used to protect against loss of data. For example, if an on-line version of one or more data sets is destroyed, corrupted, deleted, or changed because of power failure, hardware, or software error, user error or some other type of problem, the latest version of those data sets which are stored in a backup/restore subsystem can be restored and therefore the risk of loss of data is minimized. It is readily apparent that backup/restore subsystems are and will remain an important part of the field of data processing.

Successful recovery of data to a known consistent state requires a backup of all components of the data at the same consistent point-in-time. Generally, a point-in-time backup is a copy of the data that is logically consistent to a given point-in-time, with the restriction that the amount of time to obtain logical consistency is significantly less than the amount of time to actually copy the data.

Concurrent copy, also known as time-zero copy, provides the ability to create a point-in-time backup. Concurrent copy is a point-in-time backup which uses a combination software and microcode architecture to obtain a copy of the original data at the time the backup was initiated.

Snapshot copy also provides the ability to create a point-in-time backup. In the snapshot copy, pointers are copied from a virtual track table of a source virtual volume to a virtual track table of a work virtual volume, without actually moving any data on data storage devices referenced by those pointers. Upon completion of the snapshot copy, updates to the source virtual volume may be resumed. Subsequently, a backup is performed in the usual manner, except that the backup retrieves the source data from the work virtual volume rather than the source virtual volume. As a result, the snapshot provides a method for copying the source virtual volume to the work virtual volume very quickly. (The snapshot copy is further described in the above-mentioned co-pending and commonly-assigned patent application Ser. No. 09/006,548, filed on same date herewith, by David R. Blea, Donald R. Blea, Mark A. Haye, Ronald M. Kern, David M. Shackelford, and John G. Thompson, entitled "METHOD FOR IMPLEMENTING POINT-IN-TIME COPY USING A SNAPSHOT FUNCTION," attorney's docket number TU997076, which application is incorporated herein by reference.)

Unfortunately, the concurrent copy and snapshot copy are only supported on data storage subsystems that actually implement and provide these functions. Accordingly, although concurrent copy and snapshot copy each provide the ability to create a point-in-time backup, they cannot be used if part of a desired data set resides on data storage devices that support only concurrent copy and part of a desired data set resides on data storage devices that support only snapshot copy.

A main part of this problem is data set availability. To achieve a point-in-time backup, updates to the data set must be quiesced or suspended. Concurrent copy and snapshot copy each provide a quiesce window lasting on the order of several seconds. However, when concurrent copy and snapshot copy cannot be used, quiescing updates for the duration of a backup could take many minutes to hours. Unavailability of the database for this duration is simply unacceptable for most database applications, such as those for automatic teller machines (ATMs) and airline reservations systems. Therefore, a solution is needed that provides the same minimal quiesce window as concurrent copy and snapshot copy do individually.

An additional problem occurs when a backup terminates prematurely. Currently, concurrent copy loses the consistency point if any part of the concurrent copy operation fails. This can present difficulties in environments where backup windows are rare and/or failure of backup is costly. Therefore, a restart capability is needed to overcome this problem, which presents a unique challenge if multiple backup technologies are used.

On the other hand, the snapshot copy provides the ability of being able to restart backup operations without losing the consistency point of the data base, whereas concurrent copy technology may not. This difference between the technologies provides a challenge in making the technologies transparent to an end user, while providing all the capabilities each technology allows.

Thus, there is a need in the art for improved methods for providing point-in-time backup of entire data set in which different parts of data set reside on devices supporting different copy technologies.

SUMMARY OF THE INVENTION

To overcome the limitations in the prior art described above, and to overcome other limitations that will become apparent upon reading and understanding the present specification, the present invention discloses a method, apparatus, and article of manufacture for performing a point-in-time backup using multiple copy technologies, for example, concurrent copy, snapshot copy, etc. Source data on a source volume is copied by a selected one of the multiple copy technologies, depending on the devices and extents which support such copy technology. Updates to the source volume are suspended or quiesced during initialization of the copy function, so as to provide a logically consistent view of the source volume at a common point-in-time. The devices and extents of the source data are determined as to which copy technology they support. In case that a concurrent copy technology is supported, a concurrent copy session can be registered and established. In case that a snapshot copy technology is supported, pointers are copied from a virtual track table of the source volume to a virtual track table of a work virtual volume without actually moving any data on data storage devices referenced by those pointers. These are examples of concurrent copy and snapshot copy technologies. If part of the data set resides on a device which does not support point-in-time copy, serialization is acquired for the copy operation. As a result, a general solution is provided for any collection of data residing on devices that support multiple point-in-time technologies or does not support point-in-time technologies. Once the copy technology is determined, the copy of the source data is obtained. Upon successfully completion of the copy function, updates to the source volume can be resumed. If a concurrent copy or snapshot copy is not successful, serialization is obtained and held for the duration of the entire backup process, exactly as if no point-in-time technology is supported. For non-point-in-time copy technology, a serialization may not be released until a subsequent backup process is successfully made. Subsequently, a backup is performed in a usual manner while being protected by point-in-time technology or serialization. In either case, the original source data is backed up as it existed at the consistent point-in-time to a target media, such as a tape volume or other DASD devices. Then, a cleanup process is performed to withdraw a concurrent copy session, release snapshot resource, or release serialization. If the backup is not successful, a restart may be performed, and any point-in-time technology resources, including serialization, must be retained.

One object of the present invention is to provide restart capability. When a backup fails in the process, the restart capability is important to achieve a true point-in-time backup and ensure that the consistency point remains in effect. The devices and extents which comprise the data collection are determined to identify which copy technology is supported.

For a concurrent copy, the system determines if the previous concurrent copy session is still available, and if so, determines if data which had previously been read or processed is still available. Such data may exist on the original source or target devices.

For a snapshot copy, the system determines if a previous snapshot copy of the extent is available in a temporary storage area.

For a device that does not support point-in-time copy operations, the system verifies if the serialization obtained by the original backup operation is still held.

If all extents in the data collection are still available from the previous point-in-time backup, the backup may be restarted. Extents in the data collection which are not protected by a point-in-time technology remain protected by serialization. As a result, the resources held during restart include concurrent copy sessions, snapshot copies, serialization. The original data is then backed up in its consistent state to a target media, such as a tape volume or other DASD devices.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

HARDWARE ENVIRONMENT

Figure 1:
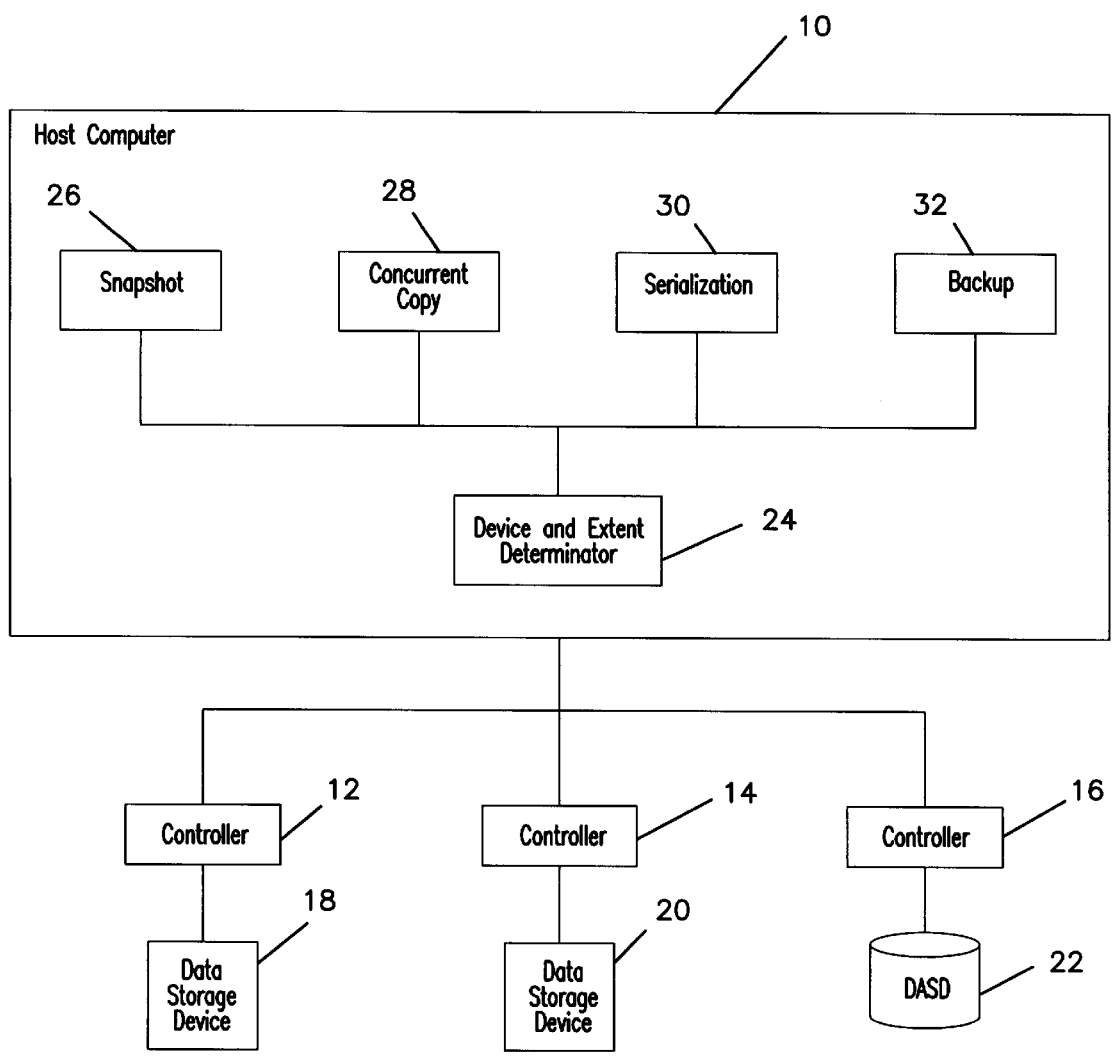
FIG. 1 is an exemplary hardware environment used to implement the preferred embodiment of the invention.

FIG. 1 is an exemplary hardware environment used to implement the preferred embodiment of the invention. A host computer 10 is coupled via a bus to storage controllers 12, 14, and 16, which themselves are coupled via I/O channels to one or more data storage devices 18, 20, and 22, respectively. In one embodiment, the data storage devices 18, 20, and 22 each comprise different data storage subsystems having different capabilities. Of course, those skilled in the art will recognize that any data storage device may be used with the present invention.

The host computer 10 executes one or more computer programs 24, 26, 28, 30, and 32 that control copy and backup operations of source data stored on the devices 18, 20, and 22. The device and extent determinator program 24 obtains information concerning the device type and the source data extent to determine, for example, the type of copy or backup operations supported by the device type.

The snapshot program 26 performs a snapshot copy for a device 18, 20, or 22 (when the device type supports the snapshot copy). The snapshot copy operates by copying pointers between virtual track tables representing different virtual data volumes without actually moving any data. However, the snapshot copy suffers from a restriction that the source and target locations must be within the data storage subsystem and the same device types.

The concurrent copy program 28 performs a concurrent copy for a device 18, 20, or 22 (when the device supports the concurrent copy). Concurrent copy, also known as time-zero copy, provides the ability to create a point-in-time backup. Concurrent copy is a point-in-time backup, which uses a combination software and microcode architecture to obtain a copy of the original data at the time the backup was initiated. However, concurrent copy is only supported for data residing on storage subsystems which implement the concurrent copy functions.

The serialization program 30 performs serialization functions for a device 18, 20, or 22 (when the device does not support other point-in-time copy technologies). Serialization prevents any transactions or programs from updating the source data. If the transactions, or even the operations within one transaction, are replicated to the backup data in a different order from how they are applied on the source data, serious inconsistencies between the source and backup data may result.

Finally, the backup program 32 performs the standard backup operations, as are well known in the art. The backup program 32 is typically used to save a recent copy or version of one or more data sets or portion thereof on some form of backup data storage device, such as magnetic or optical disk drives, tape drives, or other memory. However, successful recovery of data to a known consistent state requires a backup of all components of the data at the same consistent point-in-time. Generally, a point-in-time backup is a copy of the data which is logically consistent to a given point-intime, with the restriction that the amount of time to obtain logical consistency is significantly less than the amount of time to actually copy the data.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Those skilled in the art will also recognize that the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

FLOWCHARTS

Figure 2:
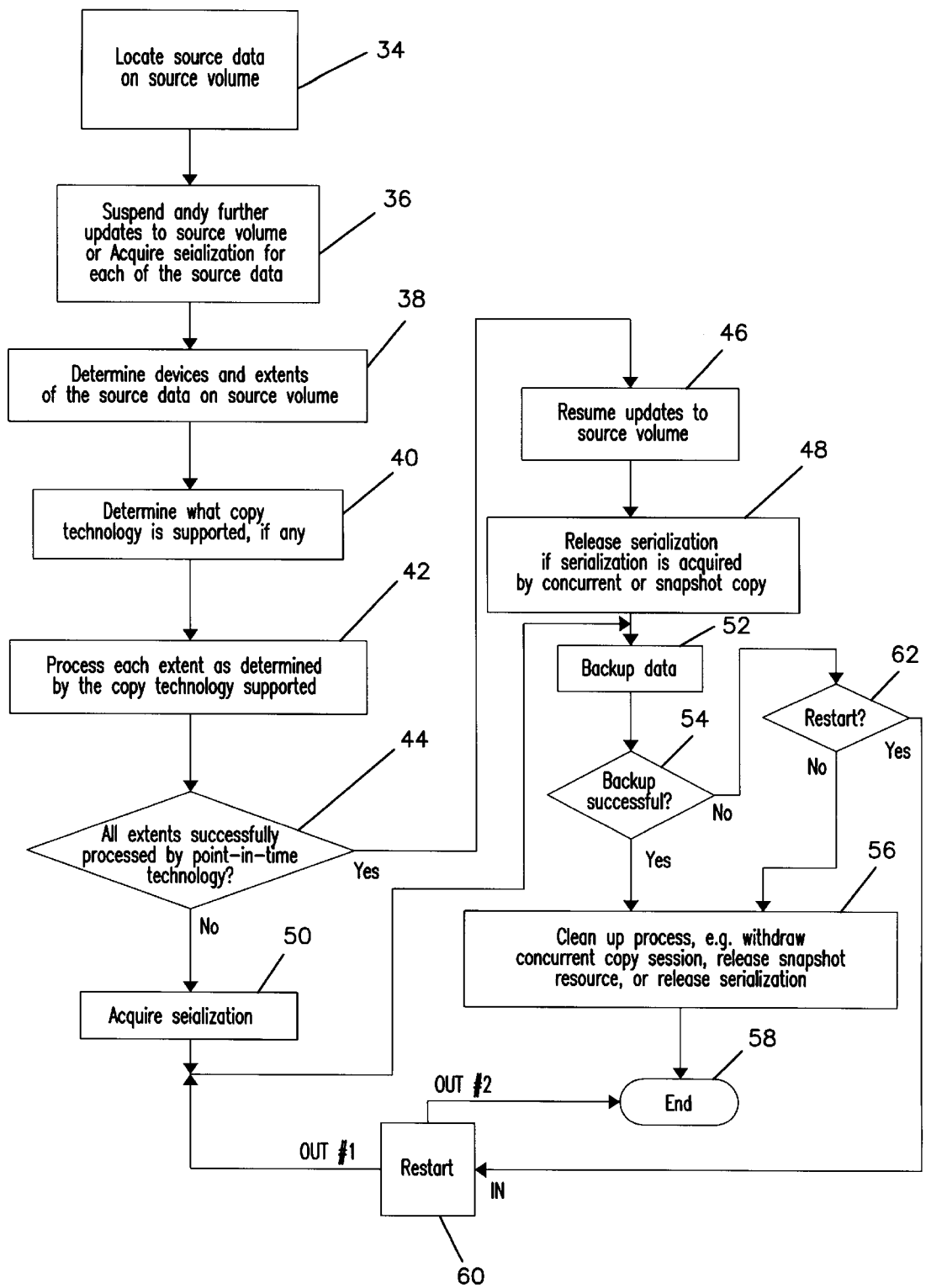
FIG. 2 is a flowchart illustrating an operation of point-in-time backup utilizing multiple copy technologies according to the present invention.

FIG. 2 is a flowchart that further illustrates an operation of point-in-time backup utilizing multiple copy technologies according to the present invention. Given a data collection, as indicated in Step 34, represented in any appropriate format such as a list of devices each containing a list of track extents, a point-in-time backup of the data collection can be obtained by backing up each extent using the appropriate technology. The overall process for obtaining a point-in-time backup can be described as follows.

1) Quiesce or suspend updates to the data collection, as indicated in Step 36. This may be accomplished under application control. For example, the data base application may temporarily cease processing transactions. Another alternative is to require the data sets comprising the collection to be closed and acquire serialization for each of the data sets. It will be appreciated that other method of quiescing or suspending updates can be used here without departure from the principles of the invention.

2) Determine the devices and extents which comprise the data collection, as indicated in Step 38.

3) For each device the data collection resides upon, determine what point-in-time backup technology is supported, if any, as indicated in Step 40.

4) Process each extent as determined by the technology supported:
   A) If the device supports a concurrent copy, register/establish a concurrent copy session.
   B) If the device supports a snapshot copy, create a snapshot copy of the extents.
   C) If the device has no capability for concurrent copy or snapshot copy (or any other similar copy technologies), provide serialization for the data set during the entire backup operation.

Accordingly, each extent as determined by the copy technology supported is processed by a point-in-time technology, as indicated in Step 42. If all extents in the data collection are successfully processed by the point-in-time technology, as determined in Step 44, updates to the data collection may be resumed, as indicated in Step 46. Serialization is thereafter released as appropriate, such that the data base application could restart transactions, as indicated in Step 48. If not all extents in the data collection are successfully processed by the point-in-time technology, as determined in Step 44, serialization of the operation is acquired, as indicated in Step 50. At this point, the backup operation is performed, as indicated in Step 52, wherein the backup operation comprises any number of different backup techniques. The backed up data is moved to a target device by the host computer 10 and the controller 12, 14, or 16 as described above.

When the entire data collection is successfully backed up, as determined in Step 54, the following cleanup functions are performed, as indicated in Step 56.

1) If a concurrent copy was used, the concurrent session is withdrawn from devices involved in the operation, and a physical controller session is terminated.

2) If a snapshot copy was used, the snapshot resources are released.

3) Otherwise, serialization is released.

It will be appreciated that a person skilled in the art would recognize that if other technologies are used, the resources required based on such technologies are released. The point-in-time backup operation then ends, as indicated in Step 58. When a backup fails, as determined in Step 54, a restart program can be performed, as indicated in Step 60, and the resources are still held for the restart program, as indicated in Step 56, unless the restart is not desired, as determined in Step 62.

If the restart of a given failed backup operation is not desired, all of the resources held for the failed backup are released, as follows:

1) Determine the devices and extents which comprise the data collection.

2) For each device the data collection resides upon, determine what point-in-time backup technology is supported, if any.

3) Release all extents which used a point-in-time technology, as indicated in Step 56.

Figure 3:
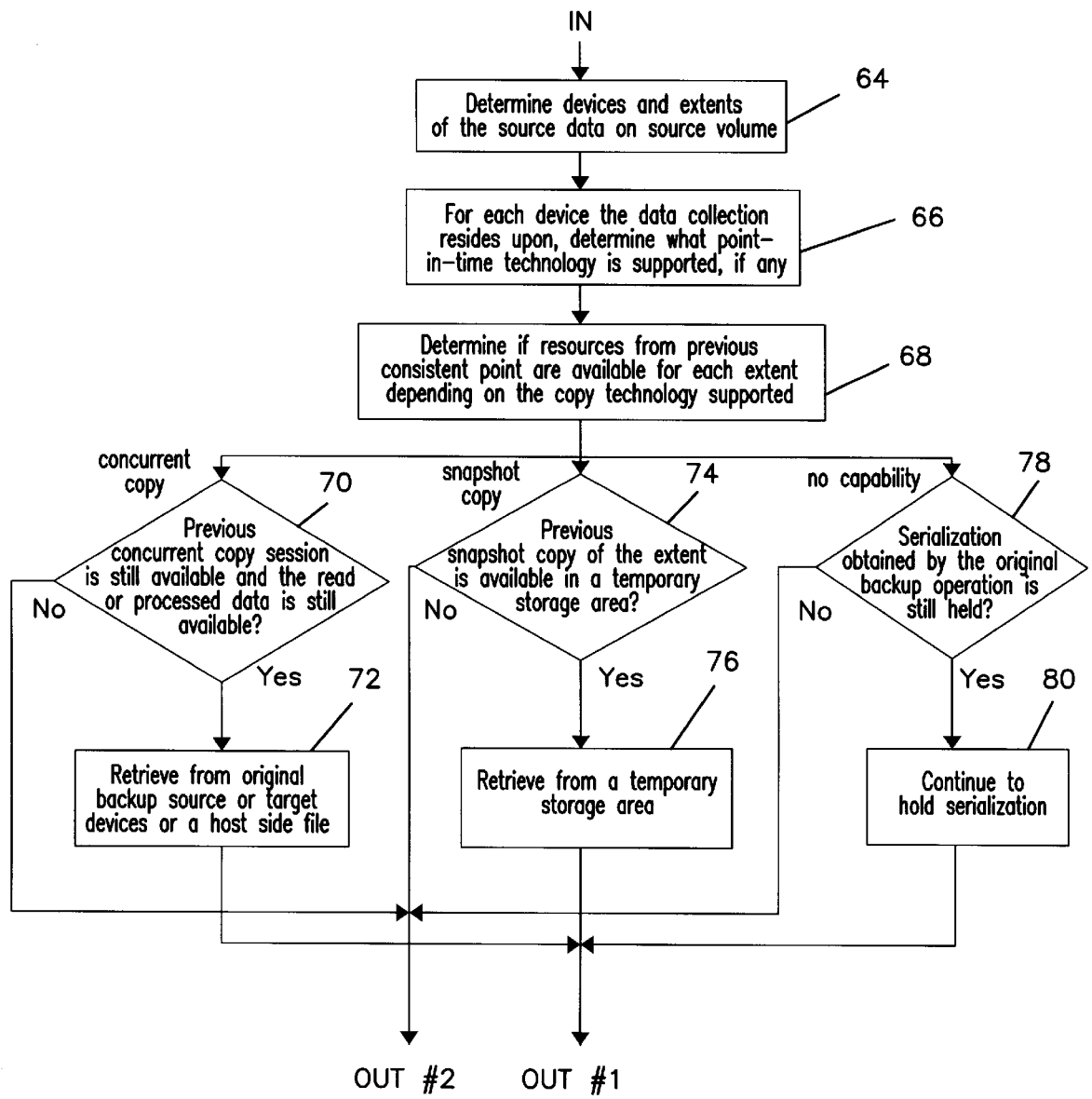
FIG. 3 is a flowchart illustrating a restart operation according to the present invention.

The restart operation shown in Step 60 of FIG. 2 has "IN" as input and "OUT #1" and "OUT #2" as outputs, which are also shown in FIG. 3. OUT #1 indicates that restart is possible, while OUT #2 indicates that restart is not possible.

FIG. 3 is a flowchart illustrating a restart operation according to the present invention as follows.

1) Determine the devices and extents which comprise the data collection, as indicated in Step 64.

2) For each device the data collection resides upon, determine what point-in-time technology is supported, if any, as indicated in Step 66.

3) Determine if resources from the previous consistent point is available for each extent depending on the technology supported, as indicated in Step 68.
   A) If the device supports a concurrent copy, determine if the previous concurrent copy session is still available and if data exists which had previously been read or processed is still available, as determined in Step 70. Such data may exist on the original backup source or target devices or in a host side file which can be retrieved for future backup, as indicated in Step 72.
   B) If the device supports a snapshot, determine if a previous snapshot copy of the extent is available in a temporary storage area, as determine in Step 74. If the previous snapshot copy of the extent is available, the copy is retrieved from the temporary storage area, as indicated in Step 76.
   C) If the device has no capability, verify if the serialization obtained by the original backup operation is still held, as determined in Step 78. If the serialization obtained by the original backup operation is still held, the serialization will be held until a future backup is complete, as indicated in Step 80.

Accordingly, if all extents in the data collection are still available from the previous point-in-time backup, the backup is restarted. Extents in the data collection which are not protected by a point-in-time technology remain protected by serialization. Since the data is protected by some method, the original data may be backed up in its consistent state to the target media, such as a tape volume.

CONCLUSION

This concludes the description of the preferred embodiment of the invention. The following paragraphs describe some alternative methods of accomplishing the same objects.

In alternative embodiments of the present invention, other types and configurations of computers could be used. For example, the invention need not be restricted to the hardware and software configuration illustrated herein. For example, other mainframes, minicomputers, personal computers, or networks of computers could be used with the present invention. In another example, peripherals other than those illustrated herein could benefit from the present invention.

In alternative embodiments of the present invention, other copy/backup technologies can be implemented in the host computer. For example, the invention need not be restricted to concurrent copy technology, snapshot technology, or serialization when the device has no capability of being point-in-time as illustrated herein.

In alternative embodiments of the present invention, other logic than that described herein could be performed without departing from the scope of the present invention. For example, the invention need not be restricted to the exact steps or elements illustrated herein.

In summary, the present invention discloses a method, apparatus, and article of manufacture for performing a point-in-time backup using multiple copy technologies. Accordingly, present invention is able to determine point-in-time backup technology available to a particular device and to invoke the proper technology to perform the function based on the available technology. As a result, the present invention maintains a consistent front-end interface independent of technology used. Further, the present invention provides a restart capability which allows the point-in-time consistency to be insured despite various system failures which occur during the backup operation.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for performing a point-in-time backup of source data stored in one or more storage devices that support one or more backup and copy technologies, the method comprising the steps of:
   (a) suspending updates to the source data;
   (b) identifying one or more extents for the source data and a type of data storage device storing the identified extents;
   (c) determining at least two copy technologies available for the identified type of storage device to create a point-in-time copy of the extents for the source data;
   (d) selecting one of the determined copy technologies; and
   (e) making a point-in-time copy of the identified extents using the selected copy technology.

2. The method of claim 1, wherein the copy technology is selected from a group comprising a concurrent copy, a snapshot copy, and a serialization copy.

3. The method of claim 1, further comprising the steps of:
   (d) determining whether there was a successful completion to the backing up step; and
   (e) resuming updates to the source data upon the successful completion.

4. The method of claim 1, further comprising the steps of:
   (d) determining whether there was a successful completion to the backing up step; and
   (e) releasing resources involved upon the successful completion.

5. The method of claim 1, further comprising the steps of:
   (d) determining whether there was a successful completion to the backing up step; and
   (e) restarting the backing up step upon an unsuccessful completion.

6. The method of claim 1, wherein selecting one of the determined copy technologies comprises:
   making a point-in-time copy of the identified extents;
   copying pointers to the data at the identified extents after determining that the point-in-time copy operation is unavailable; and
   preventing updates to the source extents to insure that data is not backed up in an inconsistent manner if the copying of pointers is unavailable.

7. An article of manufacture embodying logic that causes a processor to perform method steps for performing a point-in-time backup of source data stored in one or more storage devices that support one or more backup and copy technologies, the method comprising the steps of:
   (a) suspending updates to the source data;
   (b) identifying one or more extents for the source data and a type of data storage device storing the identified extents;
   (c) determining at least two copy technologies available for the identified type of storage device to create a point-in-time copy of the extents for the source data;
   (d) selecting one of the determined copy technologies; and
   (e) making a point-in-time copy of the identified extents using the selected copy technology.

8. The article of manufacture of claim 7, wherein the copy technology is selected from a group comprising a concurrent copy, a snapshot copy, and a serialization copy.

9. The article of manufacture of claim 7, further comprising the steps of:
   (d) determining whether there was a successful completion to the backing up step; and
   (e) resuming updates to the source data upon the successful completion.

10. The article of manufacture of claim 7, further comprising the steps of:
   (d) determining whether there was a successful completion to the backing up step; and
   (e) releasing resources involved upon the successful completion.

11. The article of manufacture of claim 7, further comprising the steps of (d) determining whether there was a successful completion to the backing up step; and (e) restarting the backing up step upon an unsuccessful completion.

12. The article of manufacture of claim 7, wherein selecting one of the determined copy technologies comprises:

making a point-in-time copy of the identified extents;

copying pointers to the data at the identified extents after determining that the point-in-time copy operation is unavailable; and preventing updates to the source extents to insure that data is not backed up in an inconsistent manner if the copying of pointers is unavailable.

13. A computer-implemented system for performing a point-in-time backup of source data stored in one or more storage devices that support one or more backup and copy technologies, comprising:

(a) a computer having one or more data storage devices connected thereto;

(b) one or more computer programs, performed by the computer, comprising:

(i) means for suspending updates to the source data;

(ii) means for identifying one or more extents for the source data and a type of data storage device storing the identified extents;

(iii) means for determining at least two copy technologies available for the identified type of storage device to create a point-in-time copy of the extents for the source data;

(iv) means for selecting one of the determined copy technologies; and (v) means for making a point-in-time copy of the identified extents using the selected copy technology.

14. The system of claim 13, wherein the copy technology is selected from a group comprising a concurrent copy, a snapshot copy, and a serialization copy.

15. The system of claim 13, wherein the computer programs further comprise:

means for determining whether there was a successful completion to the backing up step; and means for resuming updates to the source data upon the successful completion.

16. The system of claim 13, wherein the computer programs further comprise:

means for determining whether there was a successful completion to the backing up step; and means for releasing resources involved upon the successful completion.

17. The system of claim 13, further comprising:

means for determining whether there was a successful completion to the backing up step; and means for restarting the backing up step upon an unsuccessful completion.

18. The system of claim 13, wherein selecting one of the determined copy technologies comprises:

means for making a point-in-time copy of the identified extents;

means for copying pointers to the data at the identified extents after determining that the point-in-time copy operation is unavailable; and means for preventing updates to the source extents to insure that data is not backed up in an inconsistent manner if the copying of pointers is unavailable.

* * * * *

UNITED STATES PATENT AND TRADEMARK OFFICE
CERTIFICATE OF CORRECTION

PATENT NO.    : 6,078,932
DATED         : June 20, 2000
INVENTOR(S)   : Mark Alan Haye et al.

It is certified that error appears in the above-identified patent and that said Letters Patent is hereby corrected as shown below:

Column 8,
Line 67, after "of" and insert -- : --

Signed and Sealed this

Sixth Day of May, 2003

JAMES E. ROGAN
*Director of the United States Patent and Trademark Office*